(12) United States Patent
Van Vranken et al.

(10) Patent No.: US 11,606,960 B2
(45) Date of Patent: Mar. 21, 2023

(54) FOOD COMPOSITIONS AND METHODS FOR PREVENTING COPPER-ASSOCIATED HEPATOPATHIES

(71) Applicant: The Scoop Pet Food Manufacturing LLC, East Leroy, MI (US)

(72) Inventors: Philip Van Vranken, East Leroy, MI (US); Timothy Glen Vande Giessen, Kalamazoo, MI (US)

(73) Assignee: The Scoop Pet Food Manufacturing LLC, East Leroy, MI (US)

( * ) Notice: Subject to any disclaimer, the term of this patent is extended or adjusted under 35 U.S.C. 154(b) by 709 days.

(21) Appl. No.: 16/555,588

(22) Filed: Aug. 29, 2019

(65) Prior Publication Data

US 2020/0068921 A1 Mar. 5, 2020

Related U.S. Application Data

(60) Provisional application No. 62/725,817, filed on Aug. 31, 2018.

(51) Int. Cl.
| | | |
|---|---|---|
| *A23K 20/20* | (2016.01) | |
| *A23K 20/158* | (2016.01) | |
| *A23K 20/174* | (2016.01) | |
| *A23K 50/42* | (2016.01) | |
| *A23K 10/30* | (2016.01) | |
| *A23K 10/35* | (2016.01) | |
| *A23K 20/142* | (2016.01) | |

(52) U.S. Cl.
CPC .............. *A23K 20/30* (2016.05); *A23K 10/30* (2016.05); *A23K 10/35* (2016.05); *A23K 20/142* (2016.05); *A23K 20/158* (2016.05); *A23K 20/174* (2016.05); *A23K 50/42* (2016.05)

(58) Field of Classification Search
CPC .... A23K 20/30; A23K 20/142; A23K 20/158; A23K 20/174; A23K 50/42; A23K 10/30; A23K 10/35
See application file for complete search history.

(56) References Cited

U.S. PATENT DOCUMENTS

| | | | | |
|---|---|---|---|---|
| 2007/0098840 A1* | 5/2007 | Axelrod | ................ | A23K 20/20 |
| | | | | 426/2 |
| 2008/0233244 A1* | 9/2008 | Swenson | ................... | A23J 3/26 |
| | | | | 426/72 |
| 2009/0104315 A1* | 4/2009 | Friesen | ................ | A23K 20/142 |
| | | | | 705/26.1 |
| 2013/0287898 A1* | 10/2013 | Poddar | .................. | A61K 33/20 |
| | | | | 426/74 |

FOREIGN PATENT DOCUMENTS

WO WO-2018125539 A1 * 7/2018 ........... A23K 20/158

OTHER PUBLICATIONS

Carrots, raw, FoodData Central, available at: https://fdc.nal.usda.gov/fdc-app.html#/food-details/170393/nutrients; accessed on May 21, 2022; published Apr. 2018. (Year: 2018).*

* cited by examiner

*Primary Examiner* — W A Moore
(74) *Attorney, Agent, or Firm* — Price Heneveld LLP

(57) ABSTRACT

A pet food containing naturally occurring copper that can be used as a prophylactic diet to prevent and/or reduce copper storage disease, dilated cardiomyopathy, adverse gastrointestinal food reactions, and/or food allergies in pets is provided. A method for forming this pet food containing naturally occurring copper includes: providing a formula selected from the group consisting of chicken meal, corn gluten, duck, rabbit, venison, fish, peas, potato, barley, rice, corn, and any combinations thereof; and adding one or more ingredients having a naturally occurring copper source to provide a naturally occurring copper concentration in the pet food composition from about 7.3 ppm to about 25.0 ppm, adjusted for a dry matter basis.

15 Claims, No Drawings

FOOD COMPOSITIONS AND METHODS FOR PREVENTING COPPER-ASSOCIATED HEPATOPATHIES

PRIORITY CLAIM

This application claims priority under 35 U.S.C. § 119(e) to U.S. Provisional Patent Application No. 62/725,817 filed on Aug. 31, 2018. The entire contents of the aforementioned application is incorporated herein by reference.

FIELD OF THE INVENTION

The present invention generally relates to pet foods designed to prevent copper accumulation in livers, and more particularly, to foods and methods designed to prevent or at least reduce copper storage disease, dilated cardiomyopathy, adverse gastrointestinal food reactions, food allergies, and any combinations thereof in pets.

BACKGROUND OF THE INVENTION

In the mid-1990's the pet food industry changed the source of copper in pet food from cupric oxide to chelated copper sources such as copper sulfide. The predominately used chelated copper sources used and still being used today are either copper sulfate and/or copper proteinate. The use of copper sulfate and/or copper proteinate was driven by two studies that were performed on cattle and pigs that demonstrated growth was faster on cattle and pigs when cupric oxide was replaced with these chelated copper sources. Following the lead of the livestock industry and without any extensive testing on domesticated animals including dogs and cats, the Association of American Feed Control Officials ("AAFCO") announced and required pet food manufacturers to use copper sulfate and/or copper proteinate for copper fortification in their food products.

Accordingly, there is a need to both determine the long and short term effects of chelated copper sources used in pet food as a means for providing the proper nutritional supplement for dogs, cats, and the like. Developing improved diets for pets can lead to a variety of improved health benefits including, for example, reduced veterinary bills, better responses to drugs, and a longer more active lifestyle leading to better pet relationships with their caretakers.

SUMMARY OF THE INVENTION

According to one aspect of the present invention, a pet food composition is provided. The pet food composition comprises a naturally occurring copper concentration from about 7.3 ppm to about 25.0 ppm; an omega-6 fatty acid and an omega-3 fatty acid wherein the omega-6 fatty acid to omega-3 fatty acid ratio is from about 5:1 to about 10:1; at least one mineral including a zinc oxide concentration from about 150 mg/kg to about 1000 mg/kg; two or more vitamins including: a vitamin E concentration from about 300 iu/kg to about 1000 iu/kg; and a vitamin B6 concentration from about 2 mg/kg to about 50 mg/kg. The quantities provided for the components of the pet food composition are calculated on a dry matter basis.

According to another aspect of the present invention, a method of forming a pet food composition is provided. The method includes providing a formula selected from the group consisting of chicken, corn gluten, fish, venison, ostrich, rabbit, pea, potato, barley, rice, corn, and any combinations thereof; adding one or more ingredients having a naturally occurring copper source to provide a naturally occurring copper concentration in the pet food composition from about 7.3 ppm to about 25.0 ppm; adding an omega-6 fatty acid and an omega-3 fatty acid wherein the omega-6 fatty acid to omega-3 fatty acid ratio is from about 1:1 to about 10:1; adding at least one mineral including a zinc oxide concentration from about 150 mg/kg to about 1000 mg/kg; and adding two or more vitamins including a vitamin E concentration from about 300 iu/kg to about 1000 iu/kg and a vitamin B6 concentration from about 2 mg/kg to about 50 mg/kg. The quantities provided for the components of the pet food composition are calculated on a dry matter basis.

According to a still another aspect of the present invention, a method of reducing copper accumulation in pets is provided. The method includes providing a formula selected from the group consisting of chicken, corn gluten, fish, venison, ostrich, rabbit, pea, potato, barley, rice, corn, and any combinations thereof; adding one or more ingredients having a naturally occurring copper source to provide a naturally occurring copper concentration in the pet food composition from about 7.3 ppm to about 25.0 ppm to form a naturally occurring copper prophylactic pet food; and feeding a pet the naturally occurring copper prophylactic pet food. The method may further include adding an omega-6 fatty acid and an omega-3 fatty acid wherein the omega-6 fatty acid to omega-3 fatty acid ratio is from about 1:1 to about 10:1 where the omega-6 and omega-3 fatty acids are added to help prevent an arachidonic acid cascade. The method may further include adding at least one mineral including a zinc oxide concentration from about 150 mg/kg to about 1000 mg/kg where the zinc oxide concentration is added to help prevent copper absorption by a gastrointestinal tract. The method may still further include adding at least one vitamin including a vitamin E concentration from about 300 iu/kg to about 1000 iu/kg where the vitamin E concentration is added as an antioxidant to help prevent an arachidonic acid cascade. The method may still yet include adding at least one vitamin including a vitamin B6 concentration from about 2 mg/kg to about 50 mg/kg where the vitamin B6 concentration is added to help prevent cirrhosis in hepatic necrosis. The quantities provided for the components of the pet food composition are calculated on a dry matter basis.

According to yet another aspect of the present disclosure, a method of forming an AAFCO compliant pet food product or composition containing substantially no copper sulfate and/or copper proteinate is provided. The method comprises providing a formula selected from the group consisting of chicken, corn gluten, fish, venison, ostrich, rabbit, pea, potato, barley, rice, corn, and any combinations thereof; adding one or more ingredients having a naturally occurring copper source to provide a naturally occurring copper concentration in the pet food composition from about 7.3 ppm to about 25.0 ppm; adding an omega-6 fatty acid and an omega-3 fatty acid wherein the omega-6 fatty acid to omega-3 fatty acid ratio is from about 1:1 to about 10:1; adding at least one mineral including a zinc oxide concentration from about 150 mg/kg to about 1000 mg/kg; and adding two or more vitamins including a vitamin E concentration from about 300 iu/kg to about 1000 iu/kg and a vitamin B6 concentration from about 2 mg/kg to about 50 mg/kg to form the AAFCO pet food product or composition. The quantities provided for the components of the pet food composition are calculated on a dry matter basis.

According to still another aspect of the present disclosure, a method of preventing or at least reducing copper storage disease, dilated cardiomyopathy, adverse gastrointestinal food reactions, and food allergies in pets is provided. The method comprises making a prophylactic pet food composition including: a formula selected from the group consisting of chicken meal, corn gluten, fish, peas, potato, barley, rice, corn, and any combinations thereof; a naturally occurring copper concentration from about 7.3 ppm to about 25.0 ppm; at least one mineral including a zinc oxide concentration from about 150 mg/kg to about 1000 mg/kg; a combination of DL-methionine and taurine; an omega-6 fatty acid and an omega-3 fatty acid wherein the omega-6 fatty acid to omega-3 fatty acid ratio is from about 1:1 to about 5:1; two or more vitamins including a vitamin E concentration from about 300 iu/kg to about 1000 iu/kg and a vitamin B6 concentration from about 2 mg/kg to about 50 mg/kg; and substantially no beef, substantially no milk, and substantially no wheat. The method further comprises feeding the pet the prophylactic pet food composition to prevent or at least reduce the risk of copper storage disease, dilated cardiomyopathy, adverse gastrointestinal food reactions, and food allergies in pets. In some aspects, the prophylactic pet food composition is an AAFCO compliant food product or composition. The quantities provided for the components of the pet food composition are calculated on a dry matter basis.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Nearly 70% of all U.S. households own a pet where pet owners collectively spend billions of dollars annually on pet care including veterinary expenses such as wellness checks and parasite control. Pet food can account for nearly 40% of a pet's cost so there exists a high demand for improved pet food diets that can both improve a pet's health and reduce other expenses such as veterinary bills.

Definitions

Unless defined otherwise, all technical and scientific terms used herein have the same meaning as commonly understood by one of ordinary skill in the art to which this disclosure belongs. Accordingly, the following terms are intended to have the following meanings:

As used in the specification and claims, the singular form "a", "an" and "the" includes plural references unless the context clearly dictates otherwise.

As used herein, "administration" of a disclosed compound encompasses the delivery to a subject of a compound as described herein, or a prodrug or other pharmaceutically acceptable derivative thereof, using any suitable formulation or route of administration, e.g., as described herein.

As used herein, "treatment" and "treating", are used interchangeably herein, and refer to an approach for obtaining beneficial or desired results including, but not limited to, therapeutic benefit. By therapeutic benefit is meant eradication or amelioration of the underlying disorder being treated. Also, a therapeutic benefit is achieved with the eradication or amelioration of one or more of the physiological symptoms associated with the underlying disorder such that an improvement is observed in the patient, notwithstanding that the patient can still be afflicted with the underlying disorder.

As used herein, "subject" or "patient" to which administration is contemplated includes, but is not limited to, humans (i.e., a male or female of any age group, e.g., a pediatric subject (e.g., infant, child, adolescent) or adult subject.

As used herein, the term, "chelated copper" is defined to include supplemental, man-made, and/or synthetically produced copper in the +1 and/or +2 oxidation state where the charged copper includes the formation of at least one coordinate bond between the charged copper and a ligand, chelant, chelator, chelating agent, and/or sequestering agent. In some aspects, the chelated copper may include, for example, copper sulfate, copper acetate, copper carbonate, copper complexed with amino acids (e.g., copper glycinate), copper complexed with polysaccharides, and/or copper proteinate.

As used herein, the term "naturally occurring copper" is defined to include naturally occurring forms of copper including copper in a zero (0) oxidation state having no ligand, chelant, chelator, chelating agent, and/or sequestering agent; in addition, the naturally occurring copper can include copper in the +1 and/or +2 oxidation state where the charged copper includes at least one coordinate bond between the charged copper and a ligand, protein, chelant, chelator, chelating agent, and/or sequestering agent as naturally produced by plants or other organisms. In some aspects, the naturally occurring copper may comprise copper oxide including cupric oxide (CuO), cuprous oxide ($Cu_2O$), or a combination thereof. In some aspects, the naturally occurring copper may comprise copper oxide and a blend of other metal oxides including zinc oxide.

As used herein, the term "All Life Stage" and/or "Growth & Reproduction" pet food is currently defined to have a minimum of 12.4 ppm copper and a higher crude protein content of at least 22.5 wt % as required by the Association of American Feed Control Officials (AAFCO). These minimum values of nutrient and ingredients defined herein for the "All Life Stage" and/or "Growth & Reproduction" pet food compositions may change based on the Annual Official Publication release by AAFCO.

As used herein, the term "Adult Maintenance" pet food is currently defined to have a minimum of 7.3 ppm copper and a higher crude protein content of at least 18.0 wt % as required by the Association of American Feed Control Officials (AAFCO). These minimum values of nutrient and ingredients defined herein for the "Adult Maintenance" pet food composition may change based on the Annual Official Publication release by AAFCO.

As used herein, the term "Sensitive Stomach, Skin, & Coat" is currently defined to have a minimum of 7.3 ppm copper as required by the Association of American Feed Control Officials (AAFCO). These minimum values of nutrient and ingredients defined herein for the "Sensitive Stomach, Skin, & Coat" pet food composition may change based on the Annual Official Publication release by AAFCO.

As used herein, unless otherwise indicated, the term "treat", in all its verb forms, is used herein to mean to relieve, alleviate, prevent, and/or manage at least one symptom of a disorder in a pet, the disorder including, for example, copper storage disease, dilated cardiomyopathy, adverse gastrointestinal food reactions, food allergies, gastrointestinal disorders, such as, irritable bowel syndrome, constipation-predominant irritable bowel syndrome, antibiotic responsive diarrhea, chronically soft stools (e.g., chronic cow pie stools), chronic flatulence, chronic stomach sounds, emesis with bile, borborygnus, dyspepsia, or any combinations of symptoms thereof. Within the meaning of the present invention, the term "treat" also denotes, to arrest, delay the onset (i.e., the period prior to clinical manifestation of a disease) and/or reduce the risk of developing or worsening a disease or ailment. The term "treatment" means the act of "treating" as defined above.

As used herein, the term "prevent" or "preventing" means to arrest, delay the onset (i.e., the period prior to clinical manifestation of a disease or ailment) or reoccurrence, and/or reduce the risk of developing copper storage disease, dilated cardiomyopathy, adverse gastrointestinal food reactions, food allergies, and/or a gastrointestinal disorder, such as, irritable bowel syndrome, constipation-predominant irritable bowel syndrome, antibiotic responsive diarrhea, chronically soft stools (e.g., chronic cow pie stools), chronic flatulence, chronic stomach sounds, emesis with bile, borborygnus, dyspepsia, or any combinations of symptoms thereof relative to a pet that has not been treated or fed the pet food compositions described herein.

As used herein, the term "pet" means a domestic or tamed animal kept for companionship or pleasure. Examples of a pet include, but are not limited to, dogs, cats, birds, ferrets, gerbils, rabbits, chickens, lizards, goats, hamsters, hedgehogs, ponies, horses, parrots, pigeons, sheep, sugar gliders, turtles, turkeys, potbellied pigs, and any combinations thereof.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Copper Storage Disease

There has been an increased prevalence of copper associated liver injury in dogs over the last 15-20 years. The change in requirements by the Association of American Feed Control Officials ("AAFCO") to include copper sulfate and/or copper proteinate as a copper fortifier in their food products has been determine to lead to the gradual increase of copper accumulation in many dogs to the point that the risk of developing Copper Storage Disease ("CSD") which results in hepatitis and proceeds eventually to cirrhosis and ultimately death of the dog unless diagnosed and treated in a timely fashion. Despite no evidence of copper deficiency in dogs (experimental or clinical), this AAFCO recommendation was made to exchange unavailable copper moieties (e.g., copper oxides, others) used in canine diet formulations with bioavailable copper sulfate or chelates typically delivered using premixes. Recent research and Table 1 below indicate that the amount of copper detected in biopsied livers by veterinarians have increased at an alarming rate.

TABLE 1

Hepatic Copper Concentrations in Dogs Over Time

| Year | Hepatic Cu µg/g dry weight | References |
|---|---|---|
| 1929 | 6.8 | Flinn F B, Inouye J M, 1929 |
| 1932 | 44 | Meyer A E, Eggreet C, 1932 |
| 1956 | 80 | Beck, 1956 |
| 1972 | 154 | Gumbell, 1972 |
| 1981-1997 | 117-250 | Su L C, et al., 1982 |
| | | Keen C L, et al., 1981 |
| | | Zenter J. Meyer H., 1991 |
| 2002-2015 | 262-753 | Schultheiss P C, et al., 2002 |
| | | Cedeno, et al., 2016 |
| | | Johnson A J, et al., 2013 |
| | | Strickland J M, et al., 2018 |

This increased copper accumulation coincides with the date that AFFCO required copper sulfate and/or copper proteinate to be used as compounds for copper fortification in pet food formulations. In some instances, dogs that develop mild cases of CSD, e.g., 1,000 ppm to 1,800 ppm copper in a liver sample, may show no outward signs or symptoms of the CSD disease. Elevated amounts of copper in the liver, e.g., the 1,000 ppm to 1,800 ppm amounts noted, may become problematic when the pet/animal is prescribed a non-steroidal anti-inflammatory drug (NSAIDs) or other xenobiotic which can lead to the pet into having a liver crisis, which can frequently end in death. Such liver crises are becoming more frequent as more NSAIDS and other drugs are metabolized by the liver. The presence of a healthy liver containing less than 500 ppm copper is at least one important factor in considering the safety of using these products/compositions in dogs and other pets.

As of 2018, most AAFCO approved diets in the U.S. for canines contain copper sulfate and/or copper proteinate fortification. A large portion of the dog population in the U.S. is currently at some risk of developing CSD because of copper sulfate (CS) and/or copper proteinate (CP) being added to most dog foods. While rate of gain is a useful means of measurement in livestock, this parameter is typically not applicable to pets or their pet food formulations. CSD is grossly under diagnosed by veterinarians and their clients as they are reluctant to surgically biopsy healthy or unhealthy patients since this is the only way to diagnose CSD. Thus, the appropriate treatment of D-penacillamine is seldom prescribed. Experts believe that 90-95% of CSD goes undiagnosed and the dog dies from chronic liver failure of unknown origin. The most immediate course of action is to limit copper fortification and eliminate CS and CP from the dog food diets. Simply stated, in some aspects, eliminating highly bioavailable copper (e.g., copper sulfate and copper proteinate) one can eliminate the ingredient that causes the copper to build up in the liver and contributes to CSD.

Professor Sharon Center published an article on Canine Chronic Hepatitis in the Merck Manual of Veterinary Medicine that can be found at www.merckvetmanual.com, which is incorporated herein by reference in its entirety, an excerpt of which is provided here. Chronic hepatitis that does not focus on biliary structures is more common in dogs than cats. Several breeds are predisposed, including Bedlington Terriers, Labrador Retrievers, Cocker Spaniels, Doberman Pinschers, Skye Terriers, Standard Poodles, West Highland White Terriers, Springer Spaniels, Chihuahuas, and Maltese. Although there is an identifiable etiology for some categories of chronic hepatitis, in most cases the cause remains unidentified. Increased hepatocellular copper and Kupffer cell iron stores are common in dogs with chronic hepatitis. The degree of metal accumulation and its acinar location help determine its relevance to tissue injury. Other associated conditions include infectious canine hepatitis, chronic hepatitis secondary to infectious processes, and chronic exposure to xenobiotics (including certain drugs, biologic toxins, and chemicals). Terminology that reflects specific etiology or breed predilection, such as drug-associated chronic hepatitis, infectious chronic hepatitis, copper-associated hepatitis, etc., is preferred. The term idiopathic chronic hepatitis indicates that an etiology has not been determined. Histopathologic changes are generally similar in all cases of chronic hepatitis, regardless of the underlying cause, and include a lymphocytic-plasmacytic inflammation with infiltrates extending into hepatic parenchyma, variable single cell or piecemeal necrosis, and in advanced disease, development of bridging fibrosis and nodular regeneration. The acinar zone of involvement varies with the underlying cause.

Copper-associated hepatopathy is a leading cause of chronic hepatitis in dogs, increasing in prevalence since 1997 when copper supplements in commercial dog foods were modified to a more bioavailable form. Retrospective evaluation of liver biopsies from Labrador Retrievers and Doberman Pinschers from 1982 to 2015 indicated that dogs of these breeds, with and without chronic hepatitis, had significantly higher hepatic copper concentrations in the last 10 years of the study. Management of body copper homeostasis relies on numerous copper transporters, chaperones, and binding proteins, as well as biliary canalicular egress. Copper-associated hepatopathy is best characterized in Bedlington Terriers, which have a mutation (deletion of exon 2) of the COMMD1 copper transporter protein. Careful breeding programs guided by liver biopsy and genetic testing (PCR gene mutation test) have remarkably reduced disease frequency in Bedlington Terriers. However, some Bedlington Terriers with biopsy-confirmed copper-associated hepatopathy lack this specific gene mutation.

Food Compositions and Methods of Making

According to some embodiments disclosed herein, a pet food composition is provided. The pet food composition comprises: a naturally occurring copper concentration from about 7.3 ppm to about 25.0 ppm; an omega-6 fatty acid and an omega-3 fatty acid wherein the omega-6 fatty acid to omega-3 fatty acid ratio is from about 1:1 to about 10:1; at least one mineral including a zinc oxide concentration from about 150 mg/kg to about 1000 mg/kg; and two or more vitamins including: a vitamin E concentration from about 300 iu/kg to about 1000 iu/kg; and a vitamin B6 concentration from about 2 mg/kg to about 50 mg/kg. All of the quantities provided, including for example, weight amounts, percentages, ppm, are provided with respect to a dry matter basis. The following embodiment is provided with this additional "on a dry matter basis" descriptor to exemplify its ability to be read into each quantity listed herein. The descriptor "on a dry matter basis" is omitted elsewhere in other embodiments for brevity only.

According to other embodiments of this invention, the pet food composition comprises: a naturally occurring copper concentration from about 7.3 ppm to about 15.0 ppm on a dry matter basis; an omega-6 fatty acid and an omega-3 fatty acid wherein the omega-6 fatty acid to omega-3 fatty acid ratio is from about 5:1 to about 10:1 on a dry matter basis; at least one mineral including a zinc oxide concentration from about 150 mg/kg to about 500 mg/kg on a dry matter basis; and two or more vitamins including: a vitamin E concentration from about 300 iu/kg to about 500 iu/kg on a dry matter basis; and a vitamin B6 concentration from about 1.5 mg/kg to about 25 mg/kg on a dry matter basis.

In some aspects, the pet food composition is selected from the group consisting of a dog food, a cat food, a dog treat, a cat treat, and combinations thereof. In some aspects, the pet food composition is a dog food. In other aspects, the pet food composition is a dog treat. In some aspects, the pet food is provided having no or substantially no chelated copper, copper sulfate, and/or copper proteinate, but still meets the minimum standards set by AAFCO, for example but not limited to 7.3 ppm of copper. The pet food compositions or diets disclosed herein incorporate one or more ingredients having a naturally occurring copper source to provide a naturally occurring copper concentration of at least 7.3 ppm since these one or more ingredients have naturally occurring and/or non-chelated copper naturally disposed in them. In some aspects, the copper concentration in the pet food composition is introduced using an ingredient comprising for example, but is not limited to, tomato pumice, flaxseed, linseed, pumpkin, carrot, field peas, chickpeas, potatoes, beets, dry yeast, yeast, or any combinations thereof without using any copper fortification. In some aspects, all of the copper introduced to the pet food composition comes from the naturally occurring copper found in plants, yeasts, and/or other natural, non-man made materials. In some aspects, all of the copper introduced to the pet food composition comes from naturally occurring copper and copper oxides. In some aspects, all of the copper introduced to the pet food composition is a naturally occurring and non-bioavailable copper compound. In some aspects, all of the copper introduced to the pet food composition is a naturally occurring and limited-bioavailable copper compound.

Copper is an essential trace mineral, which means a pet only needs very small amounts of it for normal function. Elemental copper is not well-absorbed and high doses via supplements typically lead to stomach upset and other symptoms. Chelated copper is a special type of mineral supplement that may be better absorbed and easier on the stomach, although scientific evidence is lacking. Regardless, there is a danger of toxicity and serious health consequences if a pet consumes too much chelated copper. Chelated mineral supplements can frequently include minerals combined with amino acids. In some aspects, some common forms of chelated copper includes copper sulfate, copper proteinate, and/or copper glycinate, which is a molecular complex that consists of elemental copper and a chelating molecule. Manufacturers of chelated mineral supplements can frequently claim these supplements are more bioavailable because organic molecules can sometimes pass easily through the intestinal tract.

The amount of copper provided or added to the pet food composition may be adjusted according to a variety of different factors including, for example, breed, size, gender, activity level, and/or medical history. The minimum level of copper added to a pet food composition may be controlled by the requirements provided by AAFCO and may fluctuate based on future studies related to CSD and other copper or micronutrient levels. In some aspects, the copper concentration may range from about 2.5 ppm to about 100 ppm, from about 2.5 ppm to about 75.0 ppm, from about 2.5 ppm to about 50.0 ppm, from about 2.5 ppm to about 25.0 ppm, from about 2.5 ppm to about 15.0 ppm, from about 2.5 ppm to about 13.5 ppm, from about 2.5 ppm to about 12.0 ppm, from about 2.5 ppm to about 10.0 ppm, from about 2.5 ppm to about 7.3 ppm, from about 5.0 ppm to about 100 ppm, from about 5.0 ppm to about 75.0 ppm, from about 5.0 ppm to about 50.0 ppm, from about 5.0 ppm to about 25.0 ppm, from about 5.0 ppm to about 15.0 ppm, from about 5.0 ppm to about 13.5 ppm, from about 5.0 ppm to about 12.0 ppm, from about 5.0 ppm to about 10.0 ppm, from about 5.0 ppm to about 7.3 ppm, from about 7.3 ppm to about 100 ppm, from about 7.3 ppm to about 75.0 ppm, from about 7.3 ppm to about 50.0 ppm, from about 7.3 ppm to about 25.0 ppm, from about 7.3 ppm to about 15.0 ppm, from about 7.3 ppm to about 13.5 ppm, from about 7.3 ppm to about 12.0 ppm, from about 7.3 ppm to about 10.0 ppm, from about 7.3 ppm to about 9.0 ppm, or from about 7.3 ppm to about 8.0 ppm. In some aspects, the copper concentration may be about 1 ppm, about 2 ppm, about 3 ppm, about 4 ppm, about 5 ppm, about 6 ppm, about 7 ppm, about 7.3 ppm, about 8.0 ppm, about 9 ppm, about 10 ppm, about 11 ppm, about 12 ppm, about 13 ppm, about 13.3 ppm, about 14 ppm, about 15 ppm, about 20 ppm, about 25 ppm, about 50 ppm, about 75 ppm, or about 100 ppm.

The amount of fatty acids provided or added to the pet food composition may be adjusted according to a variety of different factors including, for example, breed, size, gender, activity level, and/or medical history. The minimum level of fatty acids added may be controlled by the requirements provided by AAFCO and may fluctuate based on future studies. The omega-6 fatty acid to omega-3 fatty acid ratio may be added to the pet food composition in an amount from about 1:1 to about 10:1, from about 1:1 to about 5:1, or from about 5:1 to about 10:1, where the omega-6 and omega-3 fatty acids are added to help prevent an arachidonic acid cascade. The corresponding pet food composition having omega-6 and/or omega-3 fatty acids may help prevent the arachidonic acid cascade that can occur in a case of hepatitis (inflammation of the liver). In some aspects, the omega-6 fatty acid to omega-3 fatty acid ratio is from about 1:1, 2:1, 3:1, 4:1, 5:1, 6:1, 7:1, 8:1, 9:1, 10:1, 11:1, 12:1, 13:1, 14:1, or about 15:1. In some aspects, the omega-6 fatty acid to omega-3 fatty acid ratio is from about 1:1 to about 5:1 where the omega-6 and omega-3 fatty acids are added to help prevent an arachidonic acid cascade.

The amount of minerals, either individually or in combination, provided or added to the pet food composition may be adjusted according to a variety of different factors including, for example, breed, size, gender, activity level, and/or medical history. The minimum level of zinc oxide, an exemplary mineral, added may be controlled by the requirements provided by AAFCO and may fluctuate based on future studies. The zinc oxide concentration may added to the food composition in an amount from about 150 mg/kg to about 1000 mg/kg, from about 150 mg/kg to about 500 mg/kg, from about 150 mg/kg to about 250 mg/kg, or from about 250 mg/kg to about 500 mg/kg where the zinc oxide concentration is added to help prevent or slow down copper absorption by the gastrointestinal tract of the pet/animal. In some aspects, the zinc oxide concentration may be about 50 mg/kg, about 100 mg/kg, about 150 mg/kg, about 200 mg/kg, about 250 mg/kg, about 300 mg/kg, about 350 mg/kg, about 400 mg/kg, about 450 mg/kg, about 500 mg/kg, about 550 mg/kg, about 600 mg/kg, about 650 mg/kg, about 700 mg/kg, about 750 mg/kg, about 800 mg/kg, about 850 mg/kg, about 900 mg/kg, about 950 mg/kg, or about 1,000 mg/kg.

The amount of vitamins provided or added to the pet food composition may be adjusted according to a variety of different factors including, for example, breed, size, gender, activity level, and/or medical history. The minimum level of vitamins added may be controlled by the requirements provided by AAFCO and may fluctuate based on future studies. The vitamin E concentration added to the pet food composition may be from about 300 iu/kg to about 1000 iu/kg, from about 300 iu/kg to about 700 iu/kg, or from about 300 iu/kg to about 500 iu/kg, where the vitamin E concentration is added to provide an antioxidant. In some aspects, the vitamin E concentration is added as an antioxidant to help prevent an arachidonic acid cascade. In other aspects, the vitamin E concentration, omega-6 fatty acid concentration, and omega-3 fatty acid concentration can work together to help prevent an arachidonic acid cascade.

In some aspects, the vitamins may include at least one water-soluble vitamin. The at least one water-soluble vitamin may include a vitamin B6 concentration added to the pet food composition in an amount from about 1.5 mg/kg to about 50 mg/kg, from about 1.5 mg/kg to about 50 mg/kg, from about 2 mg/kg to about 50 mg/kg, from about 2 mg/kg to about 25 mg/kg, or from about 10 mg/kg to about 25 mg/kg where the vitamin B6 concentration is added to help prevent cirrhosis in hepatic necrosis. In some aspects, the at least one water-soluble vitamin may include a vitamin B6 concentration added to the pet food composition in an amount of about 1.5 mg/kg, about 2 mg/kg, about 5 mg/kg, about 10 mg/kg, about 15 mg/kg, about 20 mg/kg, about 25 mg/kg, about 30 mg/kg, about 35 mg/kg, about 40 mg/kg, about 45 mg/kg, or about 50 mg/kg.

In some aspects, the pet food composition may include a combination of DL-methionine and taurine to prevent, treat, reduces the effects of, and/or reduce the chances of dilated cardiomyopathy in pets. In some aspects, the DL-methionine may be added to the pet food in an amount from about 5 mg/kg to about 2,000 mg/kg, from about 5 mg/kg to about 1,500 mg/kg, from about 5 mg/kg to about 1,000 mg/kg, from about 5 mg/kg to about 750 mg/kg, from about 5 mg/kg to about 500 mg/kg, or from about 5 mg/kg to about 250 mg/kg. In some aspects, the amount of DL-methionine in the pet food composition may be about 100 mg/kg, about 200 mg/kg, about 300 mg/kg, about 400 mg/kg, about 500 mg/kg, about 600 mg/kg, about 700 mg/kg, about 800 mg/kg, about 900 mg/kg, about 1,000 mg/kg, about 1,250 mg/kg, about 1,500 mg/kg, about 1, 750 mg/kg, or about 2,000 mg/kg. In some aspects, the taurine may be added to the pet food in an amount from about 5 mg/kg to about 20 g/kg, from about 5 mg/kg to about 15 g/kg, from about 5 mg/kg to about 10 g/kg, or from about 5 mg/kg to about 5 mg/kg. In some aspects, the amount of taurine in the pet food composition may be about 1 g/kg, about 2 g/kg, about 3 g/kg, about 4 g/kg, about 5 g/kg, about 6 g/kg, about 7 g/kg, about 8 g/kg, about 9 g/kg, about 10 g/kg, about 15 g/kg, about 17 g/kg, or about 20 g/kg. In some aspects, the ratio of taurine to DL-methionine is from about 1:1, 2:1, 3:1, 4:1, 5:1, 6:1, 7:1, 8:1, 9:1, 10:1, 11:1, 12:1, 13:1, 14:1, or about 15:1. In some aspects, the ratio of taurine to DL-methionine is about 10:1 and the combination of DL-methionine and taurine prevents, treats, reduces the effects of, and/or reduce the chances of dilated cardiomyopathy in pets.

In some aspects, the pet food composition may include no, or substantially no, chelated copper, supplemental copper, non-naturally occurring copper, sulfate ions, copper sulfate, copper acetate, copper carbonate, copper complexed with amino acids (e.g., copper glycinate), copper complexed with polysaccharides, copper proteinate, beef, milk, wheat, and any combinations thereof. In some aspects, the pet food composition may include no added copper sulfate. In some aspects, the pet food composition may include no added chelated copper. In other aspects, the pet food composition may include no beef, milk, and wheat to prevent, treat, reduce the effects of, and/or reduce the chances of food allergies in pets. In still other aspects, the pet food composition may include no added chelated minerals, for example, but not limited to, metal sulfates, metal carbonates, metal acetates, metal glycinates, metal citrates, and metal amino acids.

In some aspects, the pet food composition may be a prophylactic diet and not a therapeutic diet. In other aspects, the pet food composition may be both a prophylactic diet and a therapeutic diet. In still other aspects, the pet food composition may be a therapeutic diet and not a prophylactic diet. The term "prophylactic diet" as used herein is defined to include those pet food diets that do not require a prescription from a veterinarian or other pet/animal care provided to be administered. The term "therapeutic diet" as used herein is defined to include those pet food diets that require a prescription from a veterinarian or other pet/animal care provided to be administered. In some aspects, the prophylactic diet may be used as maintenance diet that is administered to the pet over a prolonged and extended period of time for the pet. In some aspects, the prophylactic diet using the pet food composition may be administered to the pet over a period including from about 1 month to about 20 years, from about 1 month to about 15 years, from about 1 month to about 10 years, from about 1 month to about 5 years, from about 1 week to over 1 year, or from about 1 week to about 6 months. In some aspects, the prophylactic diet using the pet food composition may be administered to the pet over the lifetime of the pet. In other aspects, the prophylactic diet using the pet food composition may be administered to the pet using variations of the pet food composition including: an "All Life Stage" pet food composition; an "Adult Maintenance" pet food composition; a "Growth & Reproduction" pet food composition; and a "Sensitive Stomach, Skin, & Coat" pet food composition.

In some embodiments, a method of forming a pet food composition is provided. The method includes: providing a formula or meal base (meal base used in dry food compositions) selected from the group consisting of chicken, corn gluten, fish, duck, anchovy, sardine, venison, ostrich, rabbit, pea, potato, barley, rice, corn, and any combinations thereof; adding one or more ingredients having a naturally occurring copper source to provide a naturally occurring copper concentration in the pet food composition from about 7.3 ppm to about 25.0 ppm; adding an omega-6 fatty acid and an omega-3 fatty acid wherein the omega-6 fatty acid to omega-3 fatty acid ratio is from about 1:1 to about 10:1; adding at least one mineral including a zinc oxide concentration from about 150 mg/kg to about 1000 mg/kg; and adding two or more vitamins including a vitamin E concentration from about 300 iu/kg to about 1000 iu/kg and a vitamin B6 concentration from about 2 mg/kg to about 50 mg/kg.

It is understood that the descriptions outlining and teaching the pet food composition previously discussed, which can be used in any combination, apply equally well to the method of forming the pet food composition.

In some embodiments, a method of forming an AAFCO compliant or a AAFCO certified pet food composition containing substantially no copper sulfate and/or copper proteinate, the method including: providing a formula or meal base (meal base used in dry food compositions) comprising chicken, corn gluten, fish, duck, anchovy, sardine, venison, ostrich, rabbit, pea, potato, barley, rice, corn, and any combinations thereof; adding one or more ingredients having a naturally occurring copper source to provide a naturally occurring copper concentration in the pet food composition from about 7.3 ppm to about 25.0 ppm; adding an omega-6 fatty acid and an omega-3 fatty acid wherein the omega-6 fatty acid to omega-3 fatty acid ratio is from about 1:1 to about 10:1; adding at least one mineral including a zinc oxide concentration from about 150 mg/kg to about 1000 mg/kg; and adding two or more vitamins including a vitamin E concentration from about 300 iu/kg to about 1000 iu/kg and a vitamin B6 concentration from about 2 mg/kg to about 50 mg/kg to form the AAFCO compliant or AAFCO certified pet food composition.

It is understood that the descriptions outlining and teaching the pet food composition previously discussed, which can be used in any combination, apply equally well to the method of forming the AAFCO compliant or AAFCO certified pet food composition containing substantially no copper sulfate and/or copper proteinate and no added chelated copper (e.g., copper sulfate and copper proteinate).

Treating and/or Preventing Disease and Ailments in Pets

In some aspects, a method of reducing copper accumulation in pets is provided. The method includes: providing a chicken, corn gluten, duck, anchovy, sardine, fish, venison, ostrich, rabbit, pea, potato, barley, rice, corn, and any combinations thereof, formula or meal base; and adding one or more ingredients having a naturally occurring copper source to provide a naturally occurring copper concentration in the pet food composition from about 7.3 ppm to about 15.0 ppm, from about 7.3 ppm to about 12.0 ppm, or from about 7.3 ppm to about 10.0 ppm wherein the copper concentration is not a chelated copper source.

It is understood that the descriptions outlining and teaching the pet food composition previously discussed, which can be used in any combination, apply equally well to the method of reducing copper accumulation in pets.

In additional aspects, the method may further include adding an omega-6 fatty acid and an omega-3 fatty acid wherein the omega-6 fatty acid to omega-3 fatty acid ratio is from about 1:1 to about 10:1, from about 1:1 to about 5:1, or from about 5:1 to about 10:1 where the omega-6 and omega-3 fatty acids are added to help prevent an arachidonic acid cascade. The corresponding pet food composition having omega-6 and/or omega-3 fatty acids may help prevent the arachidonic acid cascade that can occur in a case of hepatitis (inflammation of the liver). In some aspects, the omega-6 fatty acid to omega-3 fatty acid ratio is from about 1:1, 2:1, 3:1, 4:1, 5:1, 6:1, 7:1, 8:1, 9:1, 10:1, 11:1, 12:1, 13:1, 14:1, or about 15:1. In some aspects, the omega-6 fatty acid to omega-3 fatty acid ratio is from about 1:1 to about 5:1 where the omega-6 and omega-3 fatty acids are added to help prevent an arachidonic acid cascade.

In other aspects, the method may further include adding at least one mineral including a zinc oxide concentration from about 150 mg/kg to about 1000 mg/kg, from about 150 mg/kg to about 500 mg/kg, from about 150 mg/kg to about 250 mg/kg, or from about 250 mg/kg to about 500 mg/kg where the zinc oxide concentration is added to help prevent copper absorption by a gastrointestinal tract.

In still other aspects, the method may still further include adding at least one vitamin including a vitamin E concentration from about 300 iu/kg to about 1000 iu/kg, from about 300 iu/kg to about 700 iu/kg, or from about 300 iu/kg to about 500 iu/kg, where the vitamin E concentration is added to provide an antioxidant. In some aspects, the vitamin E concentration is added as an antioxidant to help prevent an arachidonic acid cascade. In other aspects, the vitamin E concentration, omega-6 fatty acid concentration, and omega-3 fatty acid concentration can work together to help prevent an arachidonic acid cascade.

In further aspects, the method may still yet include adding at least one water-soluble vitamin including a vitamin B6 concentration from about 2 mg/kg to about 50 mg/kg, from about 2 mg/kg to about 25 mg/kg, or from about 10 mg/kg to about 25 mg/kg where the vitamin B6 concentration is added to help prevent cirrhosis in hepatic necrosis.

In some aspects, the pet food composition eliminates the use of beef, pork and/or sheep by-products to prevent adding ingredients that may contain livers that are storing copper sulfate and/or copper proteinate. Since beef, pork and/or sheep, for example, are species that are fed commercial livestock diets including copper sulfate and/or copper proteinate, eliminated these types derivative by-products can help minimize or eliminate the introduction of sulfate ions that may subsequently chelate copper. It is hypothesized that cattle, pigs and sheep raised for meat have reasonably short lives and rarely are negatively affected by CSD. Because of this lack of concern, these types of livestock species can be fed generous amounts of copper sulfate and/or copper proteinate to increase rate of gain and reduce time to slaughter.

In some aspects, the liver function of a pet may be improved or maintained using the pet food composition. For example, in some aspects, the pet food composition may improve a pet's liver function from about 10% to about 50%, from about 10% to about 60%, from about 10% to about 70%, from about 10% to about 75%, from about 10% to about 80%, from about 10% to about 90%, from about 10% to about 95%, from about 10% to about 100%, from about 25% to about 50%, from about 25% to about 60%, from about 25% to about 70%, from about 25% to about 75%, from about 25% to about 80%, from about 25% to about 90%, from about 25% to about 95%, from about 25% to about 100%, from about 50% to about 60%, from about 50% to about 70%, from about 50% to about 75%, from about 50% to about 80%, from about 50% to about 90%, from about 50% to about 95%, from about 50% to about 100%, from about 75% to about 80%, from about 75% to about 90%, from about 75% to about 95%, or from about 75% to about 100% where the liver function may be measured by taking a biopsy of the pet or by performing a bile-acid detection.

In some aspects, the method of treating pets using the pet food composition may include a prophylactic diet and not a therapeutic diet. In other aspects, the method of treating pets using the pet food composition may include both a prophylactic diet and a therapeutic diet. In still other aspects, the method of treating pets using the pet food composition may include a therapeutic diet and not a prophylactic diet.

In some embodiments, a method of preventing copper storage disease in a pet is provided. The method comprises: making a prophylactic pet food composition including: a formula or meal base comprising chicken, chicken meal, corn gluten, fish, duck, anchovy, sardine, venison, ostrich, rabbit, pea, potato, barley, rice, corn, and any combinations thereof; a naturally occurring copper concentration from about 7.3 ppm to about 25.0 ppm; at least one mineral including a zinc oxide concentration from about 150 mg/kg to about 1000 mg/kg; and two or more vitamins including a vitamin E concentration from about 300 iu/kg to about 1000 iu/kg and a vitamin B6 concentration from about 2 mg/kg to about 50 mg/kg. The method further comprises feeding the pet the prophylactic pet food composition to prevent copper storage disease. In some aspects, the method further comprises preventing dilated cardiomyopathy in a pet where the prophylactic pet food composition further comprises DL-methionine and taurine. In some aspects, the method further comprises preventing adverse gastrointestinal food reactions where the prophylactic pet food composition further comprises an omega-6 fatty acid and an omega-3 fatty acid wherein the omega-6 fatty acid to omega-3 fatty acid ratio is from about 1:1 to about 5:1. In some aspects, the method further comprises preventing food allergies where the prophylactic pet food composition further comprises substantially no beef, substantially no milk, and substantially no wheat. In some aspects, the prophylactic pet food composition is an AAFCO compliant or AAFCO certified pet food composition.

It is understood that the descriptions outlining and teaching the pet food composition and methods previously discussed, which can be used in any combination, apply equally well to the method of preventing copper storage disease, preventing dilated cardiomyopathy, preventing adverse gastrointestinal food reactions, and/or preventing food allergies in pets. In some aspects, the pet food composition prevents or reduces copper storage disease, dilated cardiomyopathy, adverse gastrointestinal food reactions, and preventing food allergies in pets.

EXAMPLES

Example 1—the Healthy Liver Package Bundle

No copper fortification or chelated copper is added to the pet food composition. Omega-6 and omega-3 fatty acids are present in an omega-6:omega-3 ratio of 5:1 to 10:1. Zinc Oxide is added to the composition in no less than 150 mg/kg-500 mg/kg amount, the vitamin B6 is present in no less than an 2.0 mg/kg-25 mg/kg max amount, the vitamin E is added in no less than a 300 iu/kg-500 iu/kg max amount. The pet food composition contains all or substantially all of its vitamin or minerals in a non-sulfate or non-chelated form. Limiting or completely eliminating any and all beef, swine and sheep by-products can additionally and drastically reduce the copper sulfate and/or copper proteinate introduced into this diet.

Example 2

An "All life stage" product is based on AAFCO nutrient recommendations to provide a diet that is nutritionally adequate for any age or phase of life of a dog. Chicken meal and corn gluten meal may be the first two ingredients used in the preparation of this example pet food composition. Barley, corn, and rice can all be added in equal amounts for maximum labeling flexibility. As compared to the Diamond Care Sensitive Skin Formula competitor formulation, this example contains: 23% total protein versus 22% in the Diamond formulation; 15% fat versus 12% fat in the Diamond formulation; a omega-6 to omega-3 fatty acid ratio of 5:1 versus a 3:1 ratio in the Diamond formulation due to fewer omega-3 fatty acids used (0.47% vs. 0.8%) and similar omega-6 fatty acids (2.4% vs. 2.5%); 175 ppm zinc versus 150 ppm zinc in the Diamond formulation; and 0.65 ppm selenium versus 0.35 ppm selenium in the Diamond formulation. In addition, this pet food composition includes: vitamin B-6 (pyridoxine) at a 2.25 ppm amount to ensure the diet hits the 2.0 ppm target; biotin at a 1.0 ppm amount; and copper at a 9.1 ppm amount to meet the AAFCO recommendation of 8.0 ppm. On a dry matter basis, 1 mg/kg is defined to be equivalent to 1 ppm. A quantitative analysis of the naturally occurring copper present in the ingredients and this pet food composition determined the amount of copper each ingredient contributed to the total copper amount as provided in Table 2 below.

TABLE 2

Copper Contribution by Ingredient (estimate of % of total copper)

| Ingredient | % of Total Copper |
| --- | --- |
| Corn gluten meal | 38.6% |
| Rice | 15.2% |
| Chicken meal | 15.1% |
| Barley | 12.2% |
| Corn | 6.1% |
| Beet pulp | 5.4% |
| Dried yeast | 3.9% |
| Potato flakes | 2.9% |
| Vitamins and Minerals | 0.6% |

Example 3

A pet food composition was prepared by combining and mixing the following ingredients provided in Table 3 at the listed amounts. The provided list of ingredients can be combined and/or mixed in any particular order and their combination is not meant to be limiting.

TABLE 3

| Ingredients | Weight Percent of Total Composition |
| --- | --- |
| Chicken Meal | 14.60% |
| Corn Gluten Meal | 14.55% |
| Barley | 14.50% |
| Corn | 14.50% |
| Rice | 14.50% |
| Poultry Fat | 10.45% |
| Dried Yeast | 6.10% |
| Beet Pulp | 3.79% |
| Monocalcium Phosphate | 1.72% |
| Calcium Carbonate | 1.51% |
| Flaxseed | 1.04% |
| Salt | 0.75% |
| Natural Flavors | 0.50% |
| Vitamins and Minerals | 0.50% |
| Potassium Chloride | 0.41% |
| Preservatives | 0.30% |
| Choline chloride | 0.27% |

The pet food composition made from the ingredients provided in Table 3 did not feed as well using the a dry mix of natural flavors as it did using the liquid natural flavors used in other examples.

As provided in Table 4 below, the amount of copper meets the AAFCO requirements and falls within the other desired nutrient, mineral, and component ranges provided herein.

TABLE 4

| Ingredient | Amount in Food Composition |
| --- | --- |
| Copper | 7.30 mg/kg |
| Zinc | 184.93 mg/kg |
| Omega-6 Fatty Acid | 4.72% |
| Omega-3 Fatty Acid | 0.472% |
| Taurine | 540.20 mg/kg |
| DL-methionine | 0.6466% |
| Vitamin E | 300 iu/kg |
| Vitamin B6 | 2.2500 mg/kg |

Example 4

A pet food composition was prepared by combining and mixing the following ingredients provided in Table 5 at the listed amounts. The provided list of ingredients can be combined and/or mixed in any particular order and their combination is not meant to be limiting.

TABLE 5

| Ingredients | Weight Percent of Total Composition |
| --- | --- |
| Salmon Hydrolysate | 14.50% |
| Pea Flour | 13.75% |
| Peas | 13.75% |
| Chick pea powder | 13.38% |
| Potato Flaked | 12.14% |
| Poultry Fat | 8.73% |
| Dried Yeast | 8.00% |
| Tomato Pomace | 5.00% |
| Monocalcium Phosphate | 2.61% |
| Calcium carbonate | 2.43% |
| Beet Pulp | 2.00% |
| Flaxseed | 1.25% |
| Salt | 0.70% |
| Natural Flavors | 0.50% |
| Vitamins and Minerals | 0.50% |
| Natural Preservatives | 0.30% |
| Choline chloride | 0.27% |
| Taurine | 0.20% |

While the salmon can be an important first ingredient to use in this Skin & Coat pet food composition, the source of the salmon or other protein source is important in terms of providing the desired amount of copper. As provided in Table 6 below, the relatively high amount of copper present in this example pet food composition is a result of using farm-raised salmon that are typically fed copper sulfate or other chelated copper products to help the fish gain mass to be used as a food source. Similar to cattle, sheep, fish, pigs, poultry, and other livestock, the consumption of chelated copper sources to gain mass can be subsequently passed through to dogs and other pets through these animals used to make pet food compositions. Example 4 demonstrates the direct consequence on pet food copper concentrations where the amount of copper in the pet food can depend on the animal's history that is used to make the food.

As provided in Table 6 below, the amount of copper, although elevated, meets the AAFCO requirements and falls within the other desired nutrient, mineral, and component ranges provided herein.

TABLE 6

| Ingredient | Amount in Food Composition |
| --- | --- |
| Copper | 24.0122 mg/kg |
| Zinc | 280.7814 mg/kg |
| Omega-6 Fatty Acid | 1.6884% |
| Omega-3 Fatty Acid | 0.3377% |
| Taurine | 1,990.00 mg/kg |
| DL-methionine | 0.4633% |
| Vitamin E | 300 iu/kg |
| Vitamin B6 | 2.2500 mg/kg |

Example 5

A pet food composition was prepared by combining and mixing the following ingredients provided in Table 7 at the listed amounts. The provided list of ingredients can be combined and/or mixed in any particular order and their combination is not meant to be limiting.

TABLE 7

| Ingredients | Weight Percent of Total Composition |
| --- | --- |
| Salmon Hydrolysate | 15.39% |
| Pea Flour | 15.00% |
| Peas | 15.00% |
| Potato Flaked | 15.00% |
| Poultry Fat | 7.70% |
| Pea Protein | 5.00% |
| Chick pea powder | 5.00% |
| Beet Pulp | 5.00% |
| Pumpkin Powder | 3.00% |
| Carrot Powder | 3.00% |
| Tomato Pomace | 3.00% |
| Monocalcium Phosphate | 2.79% |

TABLE 7-continued

| Ingredients | Weight Percent of Total Composition |
|---|---|
| Calcium Carbonate | 2.64% |
| Natural Preservatives | 1.00% |
| Salmon Digest | 1.00% |
| Salmon Oil | 0.72% |
| Salt | 0.50% |
| Vitamins and Minerals | 0.50% |
| Natural Preservatives | 0.30% |
| Choline Chloride | 0.27% |
| Taurine | 0.20% |

The use of wild caught salmon in this Example 5 provided a low amount of copper in the pet food composition as compared to the elevated copper introduced by the farm raised salmon in Example 4. The 5.58 mg/kg level of copper in this example does not meet the AAFCO requirements and thus this example 5 fails as a usable food composition. The copper level in this formulation could be increased using dry yeast, yeast, tomato pumice, flaxseed, linseed, pumpkin, carrot, field peas, chickpeas, potatoes, beets, or any combinations thereof to up the amount of naturally occurring copper present in the pet food composition.

As provided in Table 8 below, the amount of copper does not meet the AAFCO requirements and falls within the other desired nutrient, mineral, and component ranges provided herein.

TABLE 8

| Ingredient | Amount in Food Composition |
|---|---|
| Copper | 5.5810 mg/kg |
| Zinc | 177.0714 mg/kg |
| Omega-6 Fatty Acid | 1.3683% |
| Omega-3 Fatty Acid | 0.2737% |
| Taurine | 1,990.00 mg/kg |
| DL-methionine | 0.3425% |
| Vitamin E | 300 iu/kg |
| Vitamin B6 | 2.2500 mg/kg |

Example 6

A pet food composition was prepared by combining and mixing the following ingredients provided in Table 9 at the listed amounts. The provided list of ingredients can be combined and/or mixed in any particular order and their combination is not meant to be limiting.

TABLE 9

| Ingredients | Weight Percent of Total Composition |
|---|---|
| Salmon Hydrolysate | 19.79% |
| Peas | 18.00% |
| Potatoes | 18.00% |
| Pea flour | 10.00% |
| Poultry fat | 7.05% |
| Chick pea powder | 5.00% |
| Monocalcium phosphate | 3.27% |
| Beet pulp | 3.00% |
| Pumpkin powder | 3.00% |
| Carrot powder | 3.00% |
| Tomato pomace | 3.00% |
| Calcium carbonate | 2.44% |
| Natural Flavors | 1.00% |
| Salmon digest flavor | 1.00% |
| Salmon oil | 0.64% |
| Salt | 0.50% |
| Vitamins and Minerals | 0.50% |
| Natural Preservatives | 0.30% |

TABLE 9-continued

| Ingredients | Weight Percent of Total Composition |
|---|---|
| Choline chloride | 0.27% |
| Taurine | 0.25% |

The use of wild caught salmon in Example 6 and its corresponding low amount of copper, as demonstrated in Example 5, can be supplemented through the addition of ingredients containing naturally occurring copper including pumpkin, carrot, peas, and beets to the pet food composition to meet the AAFCO requirements.

As provided in Table 10 below, the amount of copper meets the AAFCO requirements and falls within the other desired nutrient, mineral, and component ranges provided herein.

TABLE 10

| Ingredient | Amount in Food Composition |
|---|---|
| Copper | 7.3000 mg/kg |
| Zinc | 190 mg/kg |
| Omega-6 Fatty Acid | 3.900% |
| Omega-3 Fatty Acid | 0.7800% |
| Taurine | 2,400 mg/kg |
| DL-methionine | 0.83% |
| Vitamin E | 300 iu/kg |
| Vitamin B6 | 2.2500 mg/kg |

Example 7

A pet food composition was prepared by combining and mixing the following ingredients provided in Table 11 at the listed amounts. The provided list of ingredients can be combined and/or mixed in any particular order and their combination is not meant to be limiting.

TABLE 11

| Ingredients | Weight Percent of Total Composition |
|---|---|
| Pollock meal | 16.10% |
| Barley | 15.00% |
| Rice | 15.00% |
| Chicken meal | 10.77% |
| Poultry Fat | 9.99% |
| Oats | 7.80% |
| Flaxseed | 5.00% |
| Dry Yeast | 4.23% |
| Beet Pulp | 3.00% |
| Pumpkin Powder | 3.00% |
| Carrot Powder | 3.00% |
| Tomato Pomace | 3.00% |
| Natural flavors | 2.00% |
| Salt | 0.75% |
| Vitamins and Minerals | 0.50% |
| Natural Preservatives | 0.30% |
| Choline chloride | 0.24% |
| Taurine | 0.20% |
| Monocalcium phosphate | 0.10% |
| dl-Methionine | 0.02% |

As provided in Table 12 below, the amount of copper meets the AAFCO requirements and falls within the other desired nutrient, mineral, and component ranges provided herein.

TABLE 12

| Ingredient | Amount in Food Composition |
| --- | --- |
| Copper | 8.5000 mg/kg |
| Zinc | 195.2195 mg/kg |
| Omega-6 Fatty Acid | 3.9080% |
| Omega-3 Fatty Acid | 0.5672% |
| Taurine | 2,388.495 mg/kg |
| DL-methionine | 0.8254% |
| Vitamin E | 300 iu/kg |
| Vitamin B6 | 2.2500 mg/kg |

Example 8

A pet food composition was prepared by combining and mixing the following ingredients provided in Table 13 at the listed amounts. The provided list of ingredients can be combined and/or mixed in any particular order and their combination is not meant to be limiting.

TABLE 13

| Ingredients | Weight Percent of Total Composition |
| --- | --- |
| Chicken meal | 16.25% |
| Corn gluten meal | 16.24% |
| Barley | 14.60% |
| Corn | 14.60% |
| Rice | 14.60% |
| Poultry fat | 10.28% |
| Beet pulp | 4.00% |
| Natural Flavor | 2.00% |
| Dried yeast | 2.00% |
| Monocalcium Phosphate | 1.80% |
| Flaxseed | 1.07% |
| Calcium carbonate | 0.61% |
| Salt | 0.59% |
| Vitamins and Minerals | 0.50% |
| Natural Preservatives | 0.30% |
| Potassium chloride | 0.29% |
| Choline chloride | 0.27% |

As provided in Table 14 below, the amount of copper meets the AAFCO requirements and falls within the other desired nutrient, mineral, and component ranges provided herein.

TABLE 14

| Ingredient | Amount in Food Composition |
| --- | --- |
| Copper | 7.4577 mg/kg |
| Zinc | 186.4161 mg/kg |
| Omega-6 Fatty Acid | 4.9159% |
| Omega-3 Fatty Acid | 0.4916% |
| Taurine | 601.2500 mg/kg |
| DL-methionine | 0.6544% |
| Vitamin E | 300 iu/kg |
| Vitamin B6 | 2.2500 mg/kg |

Example 9

A pet food composition was prepared by combining and mixing the following ingredients provided in Table 15 at the listed amounts. The provided list of ingredients can be combined and/or mixed in any particular order and their combination is not meant to be limiting.

TABLE 15

| Ingredients | Weight Percent of Total Composition |
| --- | --- |
| Pollock Meal | 17.22% |
| Rice | 16.62% |
| Barley | 10.00% |
| Chicken Meal | 9.80% |
| Poultry Fat | 9.76% |
| Oats | 5.20% |
| Flaxseed | 5.15% |
| Dried Yeast | 5.10% |
| Beet Pulp | 5.00% |
| Pumpkin Powder | 4.00% |
| Carrot Powder | 4.00% |
| Tomato Pomace | 4.00% |
| Natural Flavoring | 2.00% |
| Salt | 0.50% |
| Vitamins and Minerals | 0.50% |
| Natural Preservatives | 0.30% |
| Lecithin | 0.25% |
| Choline chloride | 0.24% |
| Taurine | 0.20% |
| Monocalcium Phosphate | 0.15% |
| dl-Methionine | 0.02% |

As provided in Table 16 below, the amount of copper meets the AAFCO requirements and falls within the other desired nutrient, mineral, and component ranges provided herein.

TABLE 16

| Ingredient | Amount in Food Composition |
| --- | --- |
| Copper | 9.0366 mg/kg |
| Zinc | 195.0081 mg/kg |
| Omega-6 Fatty Acid | 3.7295% |
| Omega-3 Fatty Acid | 0.5818% |
| Taurine | 2,352.600 mg/kg |
| DL-methionine | 0.8384% |
| Vitamin E | 300 iu/kg |
| Vitamin B6 | 2.2500 mg/kg |

In some aspects, the pet food composition may include four different categories of ingredients. The categories include: 1) protein; 2) carbohydrate; 3) fat; and 4) micronutrients. In some aspects, the protein may include, for example, but is not limited to beef, chicken, lamb, goat, duck, venison, pig, bison, salmon, trout, kangaroo, horse, tuna, or combinations thereof. In some aspects, the carbohydrate may include, for example, but is not limited to wheat, corn, potato, lentils, various types of flour, chick peas, couscous, garbanzo beans, or combinations thereof. In some aspects, the fat may include an animal tallow, animal fat, beef tallow, chicken tallow, lamb tallow, goat tallow, duck tallow, venison tallow, pig tallow, bison tallow, salmon tallow, trout tallow, kangaroo tallow, horse tallow, or combinations thereof. In some aspects, the micronutrient may be, for example, a tab, powder, mix, or liquid that provides vitamins, nutrients, and/or minerals. Depending on the desired taste, calorie values, dietary restrictions, or processing ability, the pet food composition may be varied.

It will be understood that any described ingredients, processes, or steps within the described methods may be combined with other disclosed processes or steps to form structures within the scope of the present device. The exemplary compositions and methods disclosed herein are for illustrative purposes and are not to be construed as limiting.

It is also to be understood that variations and modifications can be made on the aforementioned composition and disclosed methods without departing from the concepts of the present invention, and further it is to be understood that such concepts are intended to be covered by the following claims unless these claims by their language expressly state otherwise.

The above description is considered that of the illustrated embodiments only. Modifications of the pet food composition or methods of preparing or using it to treat pets will occur to those skilled in the art and to those who make or use the composition. Therefore, it is understood that the embodiments shown in the drawings and described above is merely for illustrative purposes and not intended to limit the scope of the composition or methods, which is defined by the following claims as interpreted according to the principles of patent law, including the Doctrine of Equivalents.

What is claimed is:

1. A pet food composition comprising:
   a naturally occurring copper concentration derived from a non-chelated copper oxide and forming a total copper concentration within the pet food composition from about 7.3 ppm to about 25.0 ppm;
   an omega-6 fatty acid and an omega-3 fatty acid wherein the omega-6 fatty acid to omega-3 fatty acid ratio is from about 5:1 to about 10:1;
   at least one mineral including a zinc oxide concentration from about 150 mg/kg to about 1000 mg/kg;
   two or more vitamins comprising:
      a vitamin E concentration from about 300 IU/kg to about 1000 IU/kg; and
      a vitamin B6 concentration from about 2 mg/kg to about 50 mg/kg.

2. The pet food composition of claim 1, wherein the vitamins and minerals are free of sulfate ions.

3. The pet food composition of claim 1, wherein the naturally occurring copper concentration is provided from an ingredient selected from the group consisting of tomato pumice, flaxseed, linseed, pumpkin, carrot, field peas, chickpeas, potatoes, beets, and any combinations thereof.

4. The pet food composition of claim 1, wherein the total copper concentration is free of copper sulfate and is free of copper proteinate.

5. The pet food composition of claim 1, wherein the pet food composition is a prophylactic food composition.

6. The pet food composition of claim 1, further comprising DL-methionine and taurine.

7. The pet food composition of claim 1, wherein the pet food composition is free of beef, is free of milk, and is free of wheat.

8. The pet food composition of claim 1, wherein the non-chelated copper oxide comprises at least one of cupric oxide and cuprous oxide.

9. The pet food composition of claim 1, wherein the naturally occurring copper concentration is derived from a non-bioavailable copper.

10. The pet food composition of claim 1, wherein the pet food composition is free of sheep by-products, free of beef by-products, and free of pork by-products.

11. The pet food composition of claim 1, wherein:
    the total copper concentration in the pet food composition is from about 7.3 ppm to about 9.5 ppm;
    the omega-6 fatty acid has a concentration from about 3.5% to about 5.5%;
    the omega-3 fatty acid has a concentration from about 0.4% to about 0.6%;
    the zinc oxide concentration is from about 180 mg/kg to about 200 mg/kg;
    the vitamin E concentration is about 300 IU/kg; and
    the vitamin B6 concentration is about 2.25 mg/kg.

12. The pet food composition of claim 11, further comprising:
    DL-methionine with a concentration in a range from about 0.6% to about 0.9%; and
    taurine with a concentration in a range from about 600 mg/kg to about 2400 mg/kg.

13. The pet food composition of claim 1, wherein the pet food composition is free of chelated copper.

14. The pet food composition of claim 1, wherein the total copper concentration in the pet food composition is derived from a combination of an animal by-product and at least one of a plant and a yeast.

15. The pet food composition of claim 14, wherein the pet food composition is free of a copper supplement.

* * * * *